A. R. MUTTON.
TRAIN STOP.
APPLICATION FILED JULY 1, 1912.
1,077,739.
Patented Nov. 4, 1913.
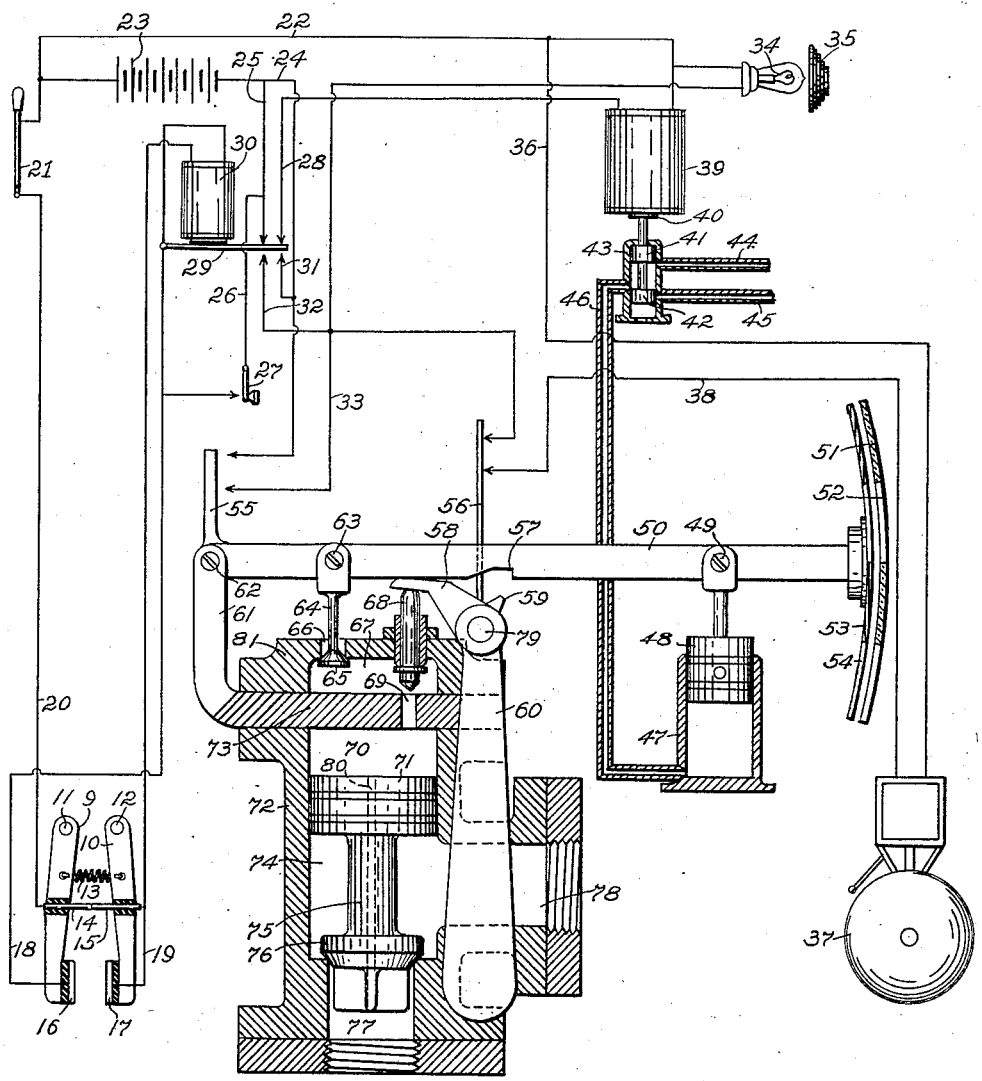
Witnesses:
M. L. Jennings
W. H. Brunn
Inventor,
A. R. Mutton,
by
G. C. Kennedy,
Attorney.

UNITED STATES PATENT OFFICE.

ARTHUR R. MUTTON, OF WATERLOO, IOWA, ASSIGNOR OF ONE-HALF TO OTIS P. HIGDON, OF WATERLOO, IOWA.

TRAIN-STOP.

1,077,739. Specification of Letters Patent. Patented Nov. 4, 1913.

Application filed July 1, 1912. Serial No. 706,963.

*To all whom it may concern:*

Be it known that I, ARTHUR R. MUTTON, a citizen of the United States of America, and a resident of Waterloo, Blackhawk county, Iowa, have invented certain new and useful Improvements in Train-Stops, of which the following is a specification.

My invention relates to improvements in actuating means for locomotive cab-signals and combined air-brake stops, and the objects of my improvements are these: To furnish in the cab of a locomotive suitable visual signals for either day or night use and also an audible alarm for the use of the engineer, and means for actuating the air-brake system of a train, all combined and co-actuated by suitable electric transmission means and automatic mechanical devices adequate to the purposes sought.

These objects I have accomplished by the means which are hereinafter described and claimed, and which are illustrated by the following drawing, in which the figure is a complete elevation, in diagrammatic form, of the electrical apparatus and mechanical working parts associated therewith, as carried in the cab of a locomotive for actuating cab-signals and actuating the air-brakes, the mechanically-actuating parts being shown in vertical transverse section.

This application relates particularly to the mechanical apparatus adapted to act upon the air-brake system of a train, and as carried in the cab of the locomotive thereof.

This device is adapted to operate on the normal danger system, that is an electric current must pass through a relay and a solenoid of the engine equipment in order to show the way clear of obstruction and the electrical equipment in operative condition. In addition to this, the air-pressure in the air-reservoir must be complete in order that the mechanical or valve-regulating means of the device may operate normally to show a "way clear" indication, and be ready to set the air-brakes on any opening of said electrical circuit.

So constructed and being in a normal working condition, any of the following will set the system in activity to stop the train upon which it is installed. Any body which may be so positioned across the rails to effect electrical conductivity therebetween, such as any iron tool or obstruction, the wheels and axles of another train, a handcar, or car blown on the main line from a siding, a broken rail, loose connections, washed out track, open draw-bridge, weak or exhausted track or local cab battery, or anything else which would interfere with a closed circuit, will cause an automatic actuation of the mechanical parts to set the air-brakes on the engine and train. In case the air-pressure of the brake-system should for any reason very gradually lessen to become inefficient, the brakes would not be actuated, yet nevertheless the cab-signals will become visible or sound, as the case may be, to warn the engineer of danger indications.

The combined system comprises the following coöperating electric and mechanically working devices. The engine equipment includes the following. A pair of lever-arms 9 and 10 on pivots 11 and 12 having at their lower ends and facing each other contact plates 16 and 17 respectively insulated therefrom and spaced apart. The arms are connected by means of a tension spring 13, and have each terminals 14 and 15 respectively normally in contact, and respectively insulated from the arms and in electrical contact with the wires 20 and 19 respectively, said wire 19 also leading to the contact-plate 17, while the contact-plate 16 is in circuit with a wire 18 leading to one terminal of a relay 30. The wire 19 leads to the other terminal of said relay, while the wire 20 leads through a switch 21 to one terminal of a local cab battery 23. By means of said connections and contacts the relay 30 is controlled by means of either the local battery 23, or by a track battery in circuit with track terminals spaced apart and adapted to be contacted by the engine terminals 16 and 17 to close a circuit therewith, as the case may be.

The numeral 39 denotes a solenoid adapted to actuate a piston-valve composed of the connected spaced apart piston-heads 41 and 42 working in a small cylinder 43 and connected to its armature or core 40. The solenoid receives current only from the local battery 23 by way of a wire 22, and its circuit is closed and controlled through a wire 28 and the contact of the terminal of the latter with the pivoted armature 29 of said relay 30. The engine equipment also includes an electric-light and a movable visual target alarm and a bell or gong audible signal, and an automatic air-valve adapted to operate to set the air-brakes of the train.

*The automatic air-valve.*—The numeral 72 denotes a cylinder whose interspace 74 contains a reciprocatory plunger 75 having spaced-apart piston-valves 71 and 76, of differential areas at opposite ends. The lower piston-valve 76 is adapted to be seated to close a valve-seat 77 leading to the train air line of the train air-brake system. A port 78 in the side of the cylinder 72 and in communication with the interspace 74, exhausts to the atmosphere. The upper end of the cylinder 72 is closed by a plate 73 to leave thereunder and between it and the upper face of the piston-head 71 an interspace or chamber 70. A hollow casting 81 is seated upon said plate 73 and incloses an interspace 67 which is in communication with the other interspace 70 by means of a port 69 in said plate 73. In said casting 81 is a port 66 normally kept closed by means of a valve 65 on a stem 64, the latter pivoted at 63 to the lever 50, the latter pivoted at its left-hand end at 62 to an upright part 61 of the plate 73. A needle-valve 68 is seated in an opening in said casting 81 so as to be moved to close the orifice 69 in the plate 73. The area of the lower face of the valve-head 76 is less than the area of the upper face of the upper valve-head 71. If we assume that the area of the head 76 is but one square inch while the area of the other head is three square inches, and further assuming that the air pressure below the head 76 is 60 pounds per square inch, the air in the chamber 70 above the head 71 would exercise a total pressure downwardly of 180 pounds as opposed to the upward pressure of sixty pounds on the lower head, and therefore the head 76 is held closed on its seat normally. The pressure in the chamber 70 is obtained by admitting air from below the head 76 through a small central vertical bore 80 in said piston-body 75. When the lever 50 is held in a horizontal position, as shown in the figure, the small valve-head 65 is drawn up by it to close the port 66, but if anything is done to depress said lever, the valve 65 moves downwardly opening said port allowing the compressed air in the chamber 70 to escape by way of the port 69 through the chamber 67 and said port 66. Since the said ports are larger in area than the small bore 80 in the piston-body 75, the air in the chamber 70 will escape faster than air will be admitted through the bore 80, until the pressure above the head 71 will be less in total amount than that on the lower head 76, when the piston-body 75 will rise letting air move from below said head 76 to the port 78 and thence to the atmosphere, which operation sets the brakes and stops the train. This process of air equalization of pressures is not instantaneous, in fact is gradual enough to permit the engineer to learn the situation because of the bell and visual alarms sounding at the same time, whereby he may use the following means to control the brakes until such time as he may wish to apply them himself.

The numeral 60 denotes a lever arm pivoted at 79 to the casting 81 and having an integral or fixed cam-head 58, and also a fixed detent 59 at its upper end. The engineer may shift this lever-arm or handle 60 to the right far enough to cause its detent 59 to become engaged in the notch 57 on the lower edge of the lever 50, while the cam-head 58 which rests upon the upper end of the needle-valve stem 68, pushes the latter down to close the port 69.

*Solenoid actuated valve.*—Referring to the small cylinder 43 and the connected piston heads 41 and 42, the numeral 44 denotes a pipe leading from the compressed-air reservoir into said cylinder, while the pipe 45 is an exhaust vent, and on the opposite side of the cylinder a pipe 46 leads to communicate with another cylinder 47 under a piston 48 whose stem is pivotally connected to the lever 50 at 49. When the piston-head 41 is down the port of the pipe 44 is closed and the other piston-head 42 is also down leaving the exhaust-pipe open so that the air can exhaust from under the piston 48 through the pipe 46. When the solenoid 39 is in circuit its core 40 lifts with the said piston-heads 41 and 42, letting air into the cylinder 43, pipe 46 and cylinder 47, and closing the exhaust pipe 45, and as the piston 48 rises, it lifts up the lever 50 to a normal horizontal position.

*Visible target signal.*—This is used in daylight, and is composed of two parts, one stationary in front and the other fixed on the right-hand end of the lever 50 immediately behind the other, but moving up and down with said lever. The stationary part comprises fixed horizontal strips alternately arranged, of any opaque white substance and clear transparent glass as shown at 51 and 52 respectively. The movable part comprises alternated strips of like dimensions of red and of white material respectively, as shown at 53 and 54. When the lever 50 is in its normal horizontal position, as shown in the figure, the white strips 54 are behind and are seen through the transparent strips 52, presenting in front a uniformly white appearance to the target, but when the lever 50 lowers, the red strips 53 fall to be seen through the strips 52, giving the target a very striking barred red and white appearance to indicate danger.

*Bell and light signals.*—The bell or gong alarm 37 is in circuit with the battery 23 by means of the conductors 22 and 36, and through the conductor 38, the bar 56 projected from the handle 69, the conductor 32, armature 29 and conductors 31 and 24 to battery. The electric-lamp 34 behind a red glass cover 35 is in electric circuit by means of the wires 22 to said battery, and the conductor 33, projection 55 on the lever 59, conductor 24 back to battery.

*Operation.*—When the engine equipment is normal, circuit is closed from the battery 23, switch 21, wire 20, contacts 14 and 15, wire 19, relay 30 to the point where the wire 18 connects with the armature 29, through the armature to the first point of contact and back to the battery, the armature being held up by the energized relay. At the same time circuit is completed through the solenoid 39 from the left side of the battery, the wire 22, then returning by wire 28, armature 29, wire 25 to the battery. The core of the energized solenoid being lifted, the piston-heads 41 and 42 are actuated to admit air into the cylinder 47 as above described. Assuming that the train in progress brings its contact-plates 16 and 17 into contact with separated contact-rails in a track-circuit thus kept open, the shoes 16 and 17 would be spread apart enough to open the circuit between the terminals 14 and 15, and the relay 30 would lose its magnetism and control over its armature 29, which would drop. Circuit would be completed however from the track-battery to contact-plate 17, up wire 19 through the relay and down wire 18 to contact-plate 16 to said track terminals, thence back to the track battery, thus maintaining the engine circuit and equipment in a normal condition. When the contact-plates 16 and 17 leave the said track terminals, the tension of the spring 13 acts to close the circuit between the terminals 14 and 15. The device thus remains normal at all times, unless interrupted by any of the following causes.

If there should be a train or similar conducting obstruction ahead which would short-circuit the current from the track-battery through the wheels and axles of the train or through the conducting obstruction, the relay 30 would become demagnetized, the armature 29 fall, breaking the circuit through the wire 28 and solenoid 39, and the core of the latter with its connected piston-heads 41 and 42 would drop to permit air to escape from the cylinder 47. The piston 48 would descend aided by gravity, the lever 50 would drop, then setting the air-brakes by the action of the valves controlled by said lever on the air-chamber 72 and its included valve-heads. As the armature 29 dropped, it closed a circuit through the conductors 31 and 32 and the arm 55, the latter having swung to the right, closing the circuit with the conductors 24 and 33, and these actions together with the swinging of the arm 56 to the right to close the circuit with the conductors 32 and 38, caused a lighting up of the lamp 34 and also an actuation of the gong alarm 37. Since an appreciable interval elapses before said mechanism would cause the setting of the air-brakes, and since the engineer would be advised by the light and bell alarm, or the target signal, of the broken circuit, he could act in this interval to prevent the setting of the brakes till he could control the train to stop at a point desired, by moving the handle 60 to the right, to act upon the valves as above described. It will be understood that when he shifts the handle 60 the contact will be broken between the bar 56 and the terminal of the wire 38, to stop the gong alarm, but the light signal 34 and the target will continue to show danger indications until everything becomes automatically cleared. When the engineer perceives the alarm indications and checks the application of the brakes in the manner described, he proceeds with caution into the next block. If during that time, the obstruction has been removed, or the train ahead has moved from the sections ahead, such as E and F, the contact-plates of his engine will engage with the contact-rails 2 and 3 respectively, causing current to pass the relay 30, closing the armature 29, energizing the solenoid, and by this means restoring through the above described intermediate actuating apparatus, everything into its normal condition. When it is necessary to learn whether the electrically-responsive devices of said engine equipment are in normal working order, the switch 21 is thrown open which breaks the circuit from the battery 23 through the responsive devices 30 and 39, and then, if the parts are working normally, they act as above described in the same way as in the case of an opening of the track-circuit to cause the piston-valve in the chamber 72 to set the air-brakes. If the parts do not respond, it is then evident that attention must be given thereto to put them back in working condition. The circuit is restored, by first bringing back the switch 21 to closed condition, and then momentarily closing the key 27 to effect a contact with the conductor 18, and then opening said key. This is necessary, because after the opening of the switch 21, the armature 29 has dropped, breaking contact with the conductor 25 to said battery 23. Since the conductor 26 bridges the said armature, a completion of circuit through said key causes the armature to lift to reëstablish contact with said conductor 25, when the key may be opened again, since the circuit has thereby been completed.

Having described my invention, what I claim as new and desire to secure by Letters Patent, is;

1. In combination, a chamber having a valve-seat in communication with the train-line of the air-brake apparatus of a train, a differential piston-valve in said chamber comprising differential heads connected by a stem, the valve having a longitudinal bore in communication between said valve-seat and the opposite end of the chamber, an exhaust-port to the atmosphere in said chamber intermediate said piston-heads, an exhaust-channel to the atmosphere in the end of said chamber adjacent to the larger piston-head and being of larger area than the area of the bore in said piston-valve, a valve seated removably to close said last-mentioned exhaust channel and means for closing said exhaust channel independently of its said exhaust-valve.

2. In combination, a chamber having a valve-seat in communication with the train-line of the air-brake apparatus of a train, a differential piston-valve in said chamber comprising differential heads connected by a stem, the valve having a longitudinal bore in communication between said valve-seat and the opposite end of the chamber, said chamber having an exhaust-port intermediate said piston-heads, a partition in said chamber between the larger piston-head and the adjacent chamber-head to locate an interspace between said partition and chamber-head, said partition and said chamber-head each having a port and each port being of larger area than the area of the bore in said piston-valve, an exhaust-valve normally held on its seat over the port in said chamber-head, an exhaust-valve for the port in said partition normally held away from its seat, and independent means for seating the last-mentioned valve upon its seat.

3. In combination, a chamber having a valve-seat in communication with the train-line of the air-brake apparatus of a train, a differential piston-valve in said chamber comprising differential heads connected by a stem, the valve having a longitudinal bore in communication between said valve-seat and the opposite end of the chamber, said chamber having an exhaust-port to the atmosphere intermediate said piston-heads, an exhaust-port in the chamber-head adjacent to the larger piston-head, a lever-arm fulcrumed at one end on said chamber, a valve-stem pivotally connected to said arm and having a valve-head adapted to close the last mentioned exhaust-port, a cylinder containing an imperforate piston which is provided with a stem pivotally connected to said arm, a second valve-chamber containing an annularly-grooved piston having connected spaced apart heads, said chamber having a port intermediate its ends and a conduit in communication between said port and the said cylinder, said second-mentioned valve-chamber having ports adapted to be alternately in succession opened and closed respectively by the reciprocations past them of said annularly-grooved piston, one of the latter ports being in communication with a source of constant fluid pressure and the other with the atmosphere, a solenoid whose core is connected to the piston-valve in the second-mentioned chamber, an electrical circuit on the train including a source of current and said solenoid, and means for making and breaking the circuit through said solenoid.

4. In combination, a chamber having a valve-seat in communication with the train-line of the air-brake apparatus of a train, a differential piston-valve in said chamber comprising differential heads connected by a stem, the valve having a longitudinal bore in communication between said valve-seat and the other end of the chamber, said chamber having an exhaust-port to the atmosphere located intermediate said heads, and having a transverse partition in its end adjacent to the larger valve-head to furnish a separate chamber, said partition and said outer chamber wall each having ports, each of which is of larger area than the bore in said piston-valve, a lever-arm fulcrumed at one end to said valve chamber, a valve adapted to close the second-mentioned exhaust port in the said chamber pivotally connected to said arm, a needle-valve in said chamber adapted to be moved to close the port in said partition, engaging-means on said lever-arm, a bell-crank lever fulcrumed on said chamber with one member thereof in operative contact with said needle-valve and said lever being provided with engaging-means adapted to become detachably engaged with the engaging means on said lever-arm when the latter is dropped and the bell-crank lever is moved toward it.

5. In combination, a chamber having a valve-seat in communication with the train-line of the air-brake apparatus of a train, a differential piston - valve in said chamber having oppositely-located heads of different areas, the smaller head being adapted to close the valve-seat opening, an exhaust-port being provided in said chamber adapted to communicate with said valve-seat opening only when the piston-valve is raised therefrom, another chamber in communication with the first-mentioned chamber above the larger piston-head and provided with an exhaust-port, means for closing and opening the last-mentioned exhaust-port, and means of communication between the said valve-seat opening and the end of the first-mentioned chamber above said larger piston-head, said means of communication being of less conducting area than the area of the last-mentioned exhaust-port or the communicating opening between the two chambers.

6. In combination, a chamber having a valve-seat in communication with the train-line of the air-brake apparatus of a train, a differential piston-valve in said chamber having oppositely-located heads of different areas, the smaller head being adapted to close the valve-seat opening, an exhaust-port being provided in said chamber adapted to communicate with said valve-seat opening only when the piston-valve is raised therefrom, means of communication between the valve-seat opening and the end of said chamber above said larger piston-head, an exhaust-channel to the atmosphere in the end of said chamber above said larger piston-head and being of larger area than the conducting area of the communication between this end of the chamber and said valve-seat, a valve seated removably to close said last-mentioned exhaust-channel, and means for closing said exhaust-channel independently of its said exhaust-valve.

Signed at Waterloo, Iowa, this 21st day of June, 1912.

ARTHUR R. MUTTON.

Witnesses:
W. H. BRUNN,
GEO. C. KENNEDY.

---

Copies of this patent may be obtained for five cents each, by addressing the "Commissioner of Patents, Washington, D. C."